United States Patent [19]

Zimmermann et al.

[11] Patent Number: 4,563,012
[45] Date of Patent: Jan. 7, 1986

[54] SEALING ARRANGEMENT FOR COUNTER-ROTATING SHAFTS

[75] Inventors: Horst Zimmermann, Munich; Joachim Lorenz, Dachau, both of Fed. Rep. of Germany

[73] Assignee: MTU Motoren und Turbinen-Union Munich GmbH, Fed. Rep. of Germany

[21] Appl. No.: 592,249

[22] Filed: Mar. 22, 1984

[30] Foreign Application Priority Data

Mar. 26, 1983 [DE] Fed. Rep. of Germany ....... 3311121
Jan. 27, 1984 [DE] Fed. Rep. of Germany ....... 3347779

[51] Int. Cl.⁴ .......................... F16J 15/42; F16J 15/44
[52] U.S. Cl. ........................................ 277/13; 277/68; 277/135
[58] Field of Search ................ 277/3, 13, 14 R, 14 V, 277/25, 53, 54, 67–69, 135, 203, 204

[56] References Cited

U.S. PATENT DOCUMENTS

| 813,723 | 2/1906 | Longwell et al. | 277/13 |
|---|---|---|---|
| 1,487,849 | 3/1924 | Grauert | 277/14 X |
| 1,895,497 | 1/1933 | Stiefel | 277/3 |
| 1,949,428 | 3/1934 | McGee | 277/13 X |
| 2,153,640 | 4/1939 | Podbielniak | 277/14 V X |
| 2,488,200 | 11/1949 | Juhlin et al. | 277/135 X |
| 3,068,800 | 12/1962 | Mueller | 277/3 X |
| 3,068,801 | 12/1962 | Murray | 277/3 X |
| 3,443,813 | 5/1969 | Carlsson | 277/68 X |

FOREIGN PATENT DOCUMENTS 789671 1/1958 United Kingdom ................ 277/13

Primary Examiner—Robert S. Ward
Attorney, Agent, or Firm—Craig and Burns

[57] ABSTRACT

A non-contacting sealing arrangement for sealing two counter-rotating shafts with the aid of a housing having a tire-casing-like shape which surrounds at least one centrifugal disk connected for rotation in unison with one rotatable shaft and laterally surrounded by the casing-like part with a narrow gap; the casing-like part is arranged eccentrically to the axis of the shaft on which the centrifugal disk is mounted in order to thus assure a return feed for the liquid sealing medium, such as oil, to bearing places. The invention enables alternate pressure loads and is particularly suited in applications between at least two bearing chambers of aircraft propulsion units.

22 Claims, 3 Drawing Figures

SEALING ARRANGEMENT FOR COUNTER-ROTATING SHAFTS

The present invention relates to a non-contacting sealing arrangement between a first part rotating in one direction and a second part rotating in a direction opposite the direction of rotation of the first part.

The sealing of shafts extending from a housing where a slight excess pressure is found within the housing has been solved in various ways, for example, by F. Wankel. Known seals which are intended for sealing between a rotating and a stationary part are complicated and therefore prone to troubles and failures. A particular type of known seals are the liquid seals. The latter requires a closed housing which contains the liquid, for example, water or mercury. Apart from corrosion problems, such seals, of course, are not low in friction which becomes noticeable in a disadvantageous manner in particular at higher rotational speeds.

The sealing of shafts which are rotatable in mutually opposite directions, poses a special problem. If one were to use, for example, a customary seal packing, then a friction problem would exist if the same were to be effective. If one were to use therefor a customary labyrinth seal, then the gaps necessary therefor would lead to leakages in case of excess pressure.

It is the object of the present invention to provide a non-contacting sealing arrangement which is both simple in construction and also reliable in operation. The seal of the present invention is to be usable at excess pressures (even though only low) and at higher rotational speeds for counter-rotating shafts.

The underlying problems are solved according to the present invention by a non-contacting sealing arrangement having a fluid (liquid) sealing medium disposed between a first and a second rotating part, of which one part includes a centrifugal disk, which is characterized by the fact that the sealing medium is adapted to be led in between the first rotating part and the second counter-rotating part.

The particular advantages which result from the described and illustrated features of the present invention, are essentially as follows:

The present invention represents a sealing arrangement for sealing two mutually oppositely rotating shafts which is extraordinarily well suited for the required operating conditions.

It permits an alternate pressure loading from either side (as viewed in the axial direction of the shaft) when it is arranged between two bearing chambers.

The sealing arrangement in accordance with the present invention even permits large pressure differences between the two sides. This renders the same particularly well suited for applications in aircraft propulsion units, especially between two bearing chambers of counter-rotating shafts. Of course, the present invention is not limited to this application. A further advantage of a sealing arrangement according to the present invention when in use in such applications, is that without separate pumps the liquid sealing medium, preferably oil, enables an emergency lubrication of bearing places, especially if, for example, dependent on the position in flight, the normal lubricant supply with the aid of a pressure pump does not function.

A high pressure builds up during the operation in the spirally shaped hollow space formed by the casing-like part of the present invention as a result of the rotating sealing medium.

Owing to the narrow gap between the centrifuging disk and the casing-like part, the sealing medium is centrifuged radially outwardly during operation by reason of the occurring centrifugal force and collected in the spirally shaped hollow space of the casing and then fed into a return line by reason of the widening of the hollow space in the direction toward one end. On the other side, for example, on the atmospheric side of a rotating part, air can enter into the spirally shaped hollow space through the narrow gap on this side formed between the centrifugal disk and the casing so that a sealing medium blockage occurs thereat. Thus, a reliable non-contacting seal between two counter-rotating shafts is created according to the present invention with the aid of simple means by exposure to the centrifugal force. The sealing medium return line is appropriately in communication with the bearing chamber of one or both rotating parts.

The circumferential rim of a centrifugal disk used in the sealing arrangement may be constructed with an acute angle in order to enable a centrifuging of the sealing medium at low circumferential velocities of a rotating part. A second centrifuging disk may be arranged on the same shaft, which is also enclosed by the casing. Furthermore, secondary seals of conventional type may be additionally installed in the sealing arrangement of the present invention.

In order to be able to collect dripping sealing medium, i.e, dripping oil and sweat oil at low circumferential velocities, pockets may be provided which are arranged at the inner circumference of the tirecasing-like part.

At least one centrifugal disk is advantageously equipped with blades in a manner to be described more fully hereinafter.

These and other objects, features and advantages of the present invention will become more apparent from the following description when taken in connection with the accompanying drawing which shows, for purposes of illustration only, two embodiments in accordance with the present invention, and wherein.

Figure 1:
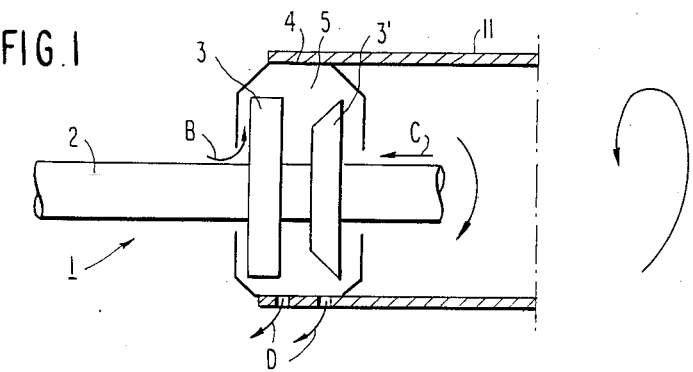
FIG. 1 is a schematic cross-sectional view through a non-contacting sealing arrangement in accordance with the present invention.

Referring now to the drawing wherein like reference numerals are used throughout the various views to designate like parts, according to the embodiment of FIG. 1, two counter-rotating shafts 2 and 11 are sealed with respect to one another with the aid of contact-free sealing arrangement generally designated by reference numeral 1. At least one of the rotating shafts includes a centrifugal disk or an integrated collar 3 which is at least partially surrounded along its circumference by a casing 4 which is essentially U-shaped in cross section. The casing 4 is preferably a sheet-metal part similar in shape to a tire casing or tire cover. The casing is preferably secured to one of the two rotatable parts, such as in FIG. 1, to the hollow shaft 11. As a result thereof, the casing 4 rotates in unison with this hollow shaft 11 opposite the direction of rotation of shaft 2.

As shown in FIG. 1, at least one shaft carries a second disk 3' which is constructed with a circumference extending at an acute angle in order to centrifuge with certainty droplets running-down during rotation, to collect the same and to feed the same to the return line. This is true in particular if oil is used as liquid sealing medium.

The arrangement and construction of the casing 4 is made in such a manner that preferably on one side (according to FIG. 1, to the left of disk (3) a rotating shaft serves as a sealing medium side whereas the other side of the casing (according to FIG. 1, to the right of the disk (3') serves as an atmospheric side, i.e., that the hollow shaft 11 includes a connection with the atmosphere, for example, a venting connection. Only a small gap exists between each disk 3, respectively, 3' and the casing both on the sealing medium side as well as on the atmospheric side, which gap extends radially between the centrifuging disk or disks and the casing.

The radially outer part (circumferential part) of the casing 4 has a hollow cylindrical shape whereby the axis of this hollow cylinder is offset in relation to the axis of the rotating shaft, respectively, rotating shafts. As a result thereof, as can be seen from FIG. 2, a spirally-shaped hollow space 5 results between the radially outer casing section and the maximum dimension of the centrifugal disk 3.

Figure 2:
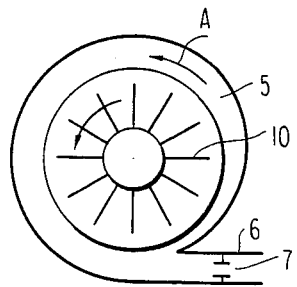
FIG. 2 is a transverse cross-sectional view of the embodiment of FIG. 1.

Within the area of the largest dimension or greatest enlargement of the spirally shaped hollow space 5, a return line 6 for the sealing medium is connected thereto, which leads to one or several bearing chambers (not shown). A restrictor 7 is located in the return line 6, which is preferably constructed nozzle-like, especially if it is to be useful for an emergency lubrication. FIG. 2 also illustrates a blading, especially radial blades 10 arranged on one side of a centrifugal disk 3 in the gap facing the casing and essentially filling the same, however, rotating relative thereto without contact.

Figure 3:
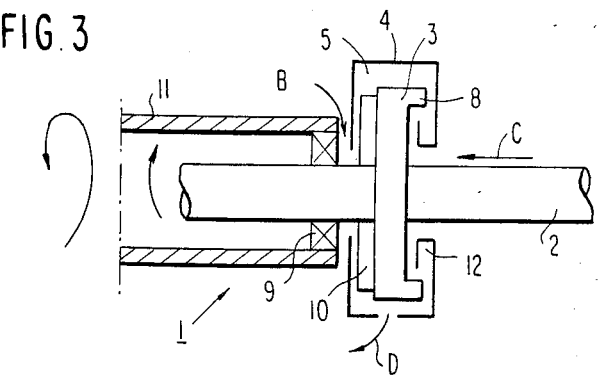
FIG. 3 is a schematic cross-sectional view through a modified embodiment of a sealing arrangement in accordance with the present invention.

In the embodiment of the present invention according to FIG. 3, a secondary seal 9, for example, a slide ring, is arranged on a rotating shaft, especially upstream of the sealing medium side of the centrifugal disk 3.

On the atmospheric side, the disk 3 is advantageously enlarged in its circumferential area into an axial flange 8, for the purpose of forming a labyrinth seal together with the collecting pockets 12 for the liquid sealing medium each as oil at the inner circumference of the casing 4.

OPERATION

The operation of the sealing arrangement according to the present invention is as follows:

Sealing medium, preferably in the form of an oil-air mixture, is sucked-in on the sealing medium side of a rotating shaft into the spirally shaped hollow space 5 of the casing 4 through the gap with the casing 4 according to the arrow B by reason of the centrifugal force acting on the disk 3, and is centrifuged radially outwardly by rotation of the disk 3, for example, with the aid of the blades 10.

In a similar manner, air enters into the hollow space 5 on the other side (atmospheric side) through the gap existing thereat.

A high pressure builds up in the spirally shaped hollow space 5 as a result of the rotating oil rotating in the direction of arrow A according to FIG. 2 so that the oil is fed back thereby into the bearing chambers by way of the return line 6 and through the restrictor 7. The restrictor 7 also serves the purpose of limiting the recirculation quantity of oil. It is possible to so adjust the same that only oil (and not air) is returned.

As indicated by the arrow D, the return line for the oil is arranged in each case at the location of the greatest enlargement of the hollow space 5 of the casing 4, i.e., at the location of maximum dimension thereof.

While we have shown and described only two embodiments in accordance with the present invention, it is understood that the same is not limited thereto but is susceptible of numerous changes and modifications as known to those skilled in the art. Moreover, modifications, especially combinations of the individual features of one embodiment with those of another or with known features can be realized without limiting the scope of the present invention. This is true in particular for the construction and coordination of the individual parts to one another and among one another as long as it serves the desired purpose. Hence, we do not wish to be limited to the details shown and described herein but intend to cover all such changes and modifications as are encompassed by the scope of the appended claims.

We claim:

1. A non-contacting sealing arrangement utilizing a fluid sealing medium between a first rotating part counter-rotating relative to a second rotating part, the sealing arrangement including centrifugal disk means disposed on one of said first rotating part and said second rotating part for centrifuging the sealing medium and means enabling introduction of the sealing medium between the first rotating part and the counter-rotating second rotating part.

2. A sealing arrangement according to claim 1, wherein the sealing medium is operable to be fed into a narrow gap between the centrifugal disk means disposed on said one of the first rotating part and the counter-rotating second rotating part and a part at least partially surrounding said centrifugal disk means, said part at least partially surrounding the centrifugal disk means being arranged on the second rotating part.

3. A sealing arrangement according to claim 2, wherein the part at least partially surrounding the centrifugal disk means is constructed essentially U-shaped in the manner of a tire-casing.

4. A sealing arrangement according to claim 3, wherein the part at least partially surrounding without contact the rotating part with the centrifugal disk means, forms a spirally shaped, circumferential hollow space means which widens in the direction of rotation of said rotating part with the centrifugal disk means and is connected within the area of its largest dimension to a sealing medium return line.

5. A sealing arrangement according to claim 4, wherein the part at least partially surrounding the centrifugal disk means is secured in one of said first rotating part and said second rotating part.

6. A sealing arrangement according to claim 4, wherein the part at least partially surrounding the centrifugal disk means is secured to one of the first rotating part and the second rotating part.

7. A sealing arrangement according to claim 4, wherein the part at least partially surrounding the centrifugal disk means is operable to be alternately acted upon with atmospheric air and liquid sealing medium.

8. A sealing arrangement according to claim 7, wherein the part at least partially surrounding the centrifugal disk means is constructed pocket-like within the area of its inner circumference for collecting oil.

9. A sealing arrangement according to claim 4, wherein the sealing medium a lubricant and the return line leading to a lubricating place includes a nozzle-like discharge opening for auxiliary lubrication.

10. A sealing arrangement according to claim 4, wherein the centrifugal disk means includes two coaxially mutually spaced disk means arranged within the part at least partially surrounding the centrifugal disk means.

11. A sealing arrangement according to claim 10, wherein the centrifugal disk means includes an additional centrifugal disk means which is constructed at its periphery to extend at an acute angle toward the outside.

12. A sealing arrangement according to claim 11, wherein at least one of the rotating parts is provided with an additional seal means.

13. A sealing arrangement according to claim 2, wherein the part at least partially surrounding without contact the rotating part with the centrifugal disk means, forms a spirally shaped, circumferential hollow space means which widens in the direction of rotation of said rotating part with the centrifugal disk means and is connected within the area of its largest dimension to a sealing medium return line.

14. A sealing arrangement according to claim 2, wherein the part at least partially surrounding the centrifugal disk means is secured in one of said first rotating part and said second rotating part.

15. A sealing arrangement according to claim 2, wherein the part at least partially surrounding the centrifugal disk means is secured to one of the first rotating part and the second rotating part.

16. A sealing arrangement according to claim 2, wherein the part at least partially surrounding the centrifugal disk means is operable to be alternately acted upon with atmospheric air and liquid sealing medium.

17. A sealing arrangement according to claim 2, wherein the part at least partially surrounding the centrifugal disk means is constructed pocket-like within the area of its inner circumferences for collecting oil.

18. A sealing arrangement according to claim 13, wherein the sealing medium is a lubricant and the return line leading to a lubricating place includes a nozzle-like discharge opening for auxiliary lubrication.

19. A sealing arrangement according to claim 2, wherein the centrifugal disk means includes two coaxially mutually spaced disk means arranged within the part at least partially surrounding the centrifugal disk means.

20. A sealing arrangement according to claim 2, wherein the centrifugal disk means includes an additional centrifugal disk means which is constructed at its periphery to extend at an acute angle toward the outside.

21. A sealing arrangement according to claim 20, wherein the centrifugal disk means includes two coaxially mutually spaced disk means arranged within the part at least partially surrounding the centrifugal disk means.

22. A sealing arrangement according to claim 1, wherein at least one of the rotating parts is provided with an additional seal means.

* * * * *